May 26, 1953   G. J. AGULE   2,640,168
ELECTRON TUBE
Filed Nov. 9, 1950
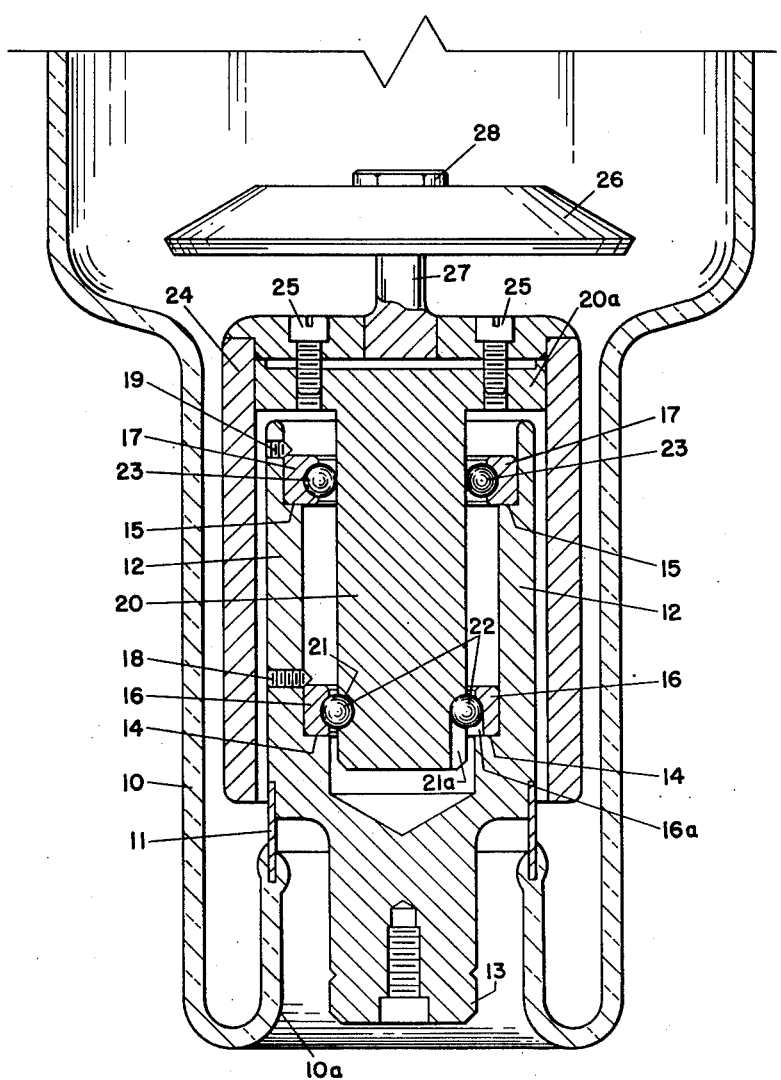
INVENTOR
GEORGE J. AGULE
BY John C. Dorfman
ATTORNEY Patented May 26, 1953

2,640,168

UNITED STATES PATENT OFFICE 2,640,168

ELECTRON TUBE

George J. Agule, Stamford, Conn., assignor to Machlett Laboratories, Incorporated, Springdale, Conn., a corporation of Connecticut Application November 9, 1950, Serial No. 194,841

4 Claims. (Cl. 313—60)

This invention relates to an electron tube which employs therein a rotatable electrode. New to the art is the particular means of mounting this electrode, thereby making its rotation smooth and long lived. Of advantage is the simplicity of the bearing structure which is composed of but a few parts lending themselves to precision manufacture. The absence of parts in tension or compression permitting a wholly unstrained structure is also of decided advantage.

Both outer and inner race structures are simplified by my invention. My outer race structure consists of two outer races, one larger than the other, and a generally cylindrical housing. The races fit within the housing, the smaller diameter race fitting into the housing further than the larger diameter race. Radial shoulders restrict the depth into the housing to which each race may go and form a solid mounting against which the races may be fixed by conventional means such as set screws. The separation of the shoulders determines the spacing between the races and thus completely eliminates the necessity for extraneous pieces such as separators. The stepped arrangement of the shoulders permits their formation with such accuracy as to assure the outer races a snug, centered fit within the housing and perfect alignment when mounted against shoulders which are perpendicular to the axis of rotation. Elimination of the many parts commonly used in prior art structures makes possible elimination of the clearances and tolerance accompanying each. Thus my structure offers a means of accurately positioning and independently retaining in position each outer race without the use of axial pressure supplied by springs or other tube parts under strain.

The type of inner bearing member which may most successfully be used in my novel construction is a one-piece bearing metal shaft similar to those described in my co-pending application Serial No. 153,371. The use of a one-piece structure as the entire central portion of my bearing system dispenses with looseness and misalignment occasioned by separate pieces used in the prior art in inner race assemblies. With all clearances and tolerances eliminated between inner race members, the shaft itself may be made to close tolerances using precision techniques well known in the art. New in my present structure is the use of a portion of the cylindrical surface of the shaft as one inner race in combination with a second inner race of the conventional groove shape formed on the shaft.

It is one object of my invention to obtain a simple structure which may be easily assembled and yet which is capable of precision operation even under the extreme conditions found in vacuum tubes. In order to attain my object I have used only four major parts exclusive of the balls and outer race retaining means (e. g., set screws). Each of these major parts is made relatively simple and requires but a few relatively inexpensive manufacturing operations. For instance, the housing may be produced by a simple drilling and counter boring operation. The inner bearing member may be machined to a precision cylindrical surface in one operation and a grooved race cut and smoothed in another. The outer races are conventional in shape and may be chosen of some convenient standard size. The small number of parts involved obviously reduces the necessary handling, and the simple shapes and accessible work areas of the parts contribute to reduction of the overall assembly time. The number of steps necessary in assembly is small and each step is sufficiently simple that it may be mastered in a short period even by unskilled workers.

In the prior art, lubrication of vacuum tube bearings remained a most serious problem until the advent of non-volatile metallic lubricants. While solving problems arising because of the location of the bearings within a vacuum, the balls were found to be damaged by sliding which caused rubbing aside of the lubricant, thus exposing to one another the unlubricated bearing surfaces. The resultant abrasion has been a source of considerable lost tube life.

Sliding is permitted by looseness and cannot easily occur when a bearing structure is tight. This means, of course, that maintenance of a snug bearing construction is important throughout tube life. In the prior art, initial looseness has been caused by the use of a great many pieces which cannot be made to close tolerances and kept to small clearances using normal manufacturing techniques and subsequent looseness has been occasioned by wear due to such causes as misalignment.

Thus another object of my invention is the prevention of misalignment and looseness in a vacuum bearing system. Misalignment of parts usually results in binding of the balls and unbalancing the system. Wear leading to rough operation and looseness is inevitable under such circumstances. Misalignment of bearing parts in the prior art has been common because the necessary tolerances of each part and the clearances between the many parts have added together to give a rather loose structure. My invention eliminates this element of difficulty because of the reduction in the number of pieces and because precision machining techniques may be applied to each of the parts of my structure to achieve reduction of tolerances. For example, as previously mentioned, no outer race spacers are used in my structure so that misalignment of one race or a spacer can no longer cause misalignment of the other race. In fact, the shoulders can be made absolutely square so that with the races mounted squarely against them, outer race misalignment is almost impossible. Looseness is also eliminated in this way, particularly since the only clearances required in my structure are between balls and races and radially between the outer races and the housing. Even these clearances may be minimized by precision techniques commonly employed in the manufacture of the balls and races. Thus, looseness is eliminated without the necessity of exerting axial pressure upon the races or in any way imposing strain upon the parts which might cause failure in service. By use of my bearing structure it is possible to reduce looseness to a point where sliding friction between the balls and races, leading to loss of metallic lubrication with the consequent abrasion of the bearing surface, is avoided.

Still another object of my invention is uniformly smooth operation despite severe temperature changes. Prior art structures have had to contend with either a general loosening or a general tightening of their major parts due to the different expansion of components. Since the major parts of my bearing system are the one piece shaft and the generally cylindrical housing, there is no longer an opportunity for loosening of the components of these parts. These two major parts as unitary pieces expand different amounts, however, particularly in the dimension parallel to the axis of rotation. Since one of the inner races is the cylindrical surface of the shaft, differences in expansion between the housing and the shaft will result in the balls assuming a new circumferential path around the shaft at the new axial level of the outer race. The fact that this cylindrical race is part of the shaft is significant in that the alignment problem would be quite difficult were it separate from the shaft. This race, in addition to being invaluable as an expansion compensation means, furnishes with simplicity the need for a larger diameter inner race to oppose the larger diameter outer race. Thus in addition to compensating for expansion differences, it simplifies bearing construction and minimizes assembly difficulties.

A final object of my invention is production of a mechanically strong bearing system capable of supplying added support where it is needed. Use of heavier rotating electrodes today puts a greater strain on bearings than they have experienced in the past. Particularly overloaded is the near-electrode bearing which carries more of the weight of the rotating structure than its more remote partner. My invention uses a larger diameter bearing near the electrode to carry the required heavy load while keeping the far bearing small. Whereas the probability of failure because of increased wear due to higher surface velocities of the balls is thus admittedly increased in the near electrode bearings, it is not raised by as large a factor as it would be were both bearings increased in diameter. Furthermore, chance of failure due to overloading is materially reduced. Since overloading on the near-electrode bearing has become the more important consideration in many instances, my invention should often make possible an overall gain in the life expectancy of tubes in which heavy rotaing elements are used.

The accompanying drawing illustrates my invention as it might be used in a rotating target X-ray tube for support of the target.

In the drawing only a portion of the vacuum envelope 10 is shown. The envelope's reentrant glass neck 10a is advantageously sealed by means of Kovar collar 11 to stationary housing member 12 which has an external stem portion 13 for cooling and terminal purposes. Within the housing 12 are formed stepped radial shoulders 14 and 15, which may be advantageously accurately formed by counter boring. One piece outer races 16 and 17 are held by set screws 18 and 19, or other appropriate retaining means, snugly against the radial shoulders 14 and 15.

Within the housing is introduced cylindrical bearing metal shaft 20 directly into which is cut a single groove-type raceway 21 near that end adjacent the closed end of the housing, usually that end remote from the supported electrode. Balls 22 and 23 covered with metallic lubricant are placed between fixed outer raceway 16 and shaft raceway 21 and between the larger outer raceway 17 and the cylindrical surface of shaft 20.

The assembly of this bearing construction is extremely simple. As a first step outer race 17 is dropped over the end of shaft 20 which should be inverted from its position in Fig. 1. It may be easily filled with balls 23 if its raceway groove is held just below inner raceway groove 21 (i. e. toward flange 20a). When filled, race 17 is advanced up the shaft, and race 16 is slipped over the end and placed opposite raceway groove 21. Balls 22 can be fed between these races through opposed grooves 16a and 21a or some equivalent. If such grooves are kept to a minimum size, experience has shown that there is small chance of loss of balls during the life of the tube. When the balls are in their races, the whole assembly on shaft 20 is inserted into housing 12. The outer races 16 and 17 will come to rest on shoulders 14 and 15 respectively and set screws 18 and 19 may be screwed through the housing wall to hold the outer races against their respective shoulders.

This bearing system is advantageously used with a rotating anode as shown in Fig. 1. Therein a rotor 24 is attached to a radial flange 20a at the electrode end of the shaft 20 through a radial shoulder held in place by means such as screws 25 parallel to the axis of rotation. The supported electrode, in this case tungsten target 26, may be affixed at the end of a stem member 27 and held in place by a nut 28 threaded to fit the small diameter end of the stem.

Although my invention also contemplates and includes a structure in which the bearing-metal shaft is fixed and the housing rotates, the structure as described above, including obvious modifications thereof, is definitely preferred. In addition to minimizing wear due to interball friction by lower surface velocity of the balls, the necessary parts and difficulty of assembling these parts are minimized by inner race rotation.

I claim:

1. An electron tube having an evacuated envelope and a rotatable electrode therein, the mounting for the rotatable electrode including a shaft of bearing metal having an inner ball race thereon, independent outer races of bearing metal supported in coaxial relation with the shaft, by a set of balls between one of the outer races and the race formed in the shaft, and a second set of balls between the other outer race and a cylindrical surface on the shaft whereby the second set of balls can move relatively to the shaft in the direction of the axis of the shaft.

2. An electron tube having an evacuated envelope and a rotatable electrode therein, the mounting for the rotatable electrode including a shaft of bearing metal having only one groove type inner ball race formed thereon, the cylindrical surface of the shaft itself serving as another inner race, independent outer races of bearing metal held in coaxial relationship with the shaft against stepped shoulders within a generally cylindrical housing, and balls within the races permitting relative rotation between shaft and outer races.

3. An electron tube having an evacuated envelope and a rotatable electrode therein, the mounting for the rotatable electrode including a shaft of bearing metal having only one groove-type inner ball race formed thereon, the cylindrical surface of the shaft itself serving as the other inner race, independent outer races of bearing metal of different diameters the smaller cooperating with the grooved inner race and the larger with the surface of the shaft, a generally cylindrical housing having stepped radial shoulders spaced from one another within the housing to accommodate outer races, and balls within the races permitting relative rotation between shaft and outer races.

4. An electron tube having an evacuated envelope and a rotatable electrode therein, the mounting for the rotatable electrode including a rotatable shaft of bearing metal having only one groove-type inner ball race formed thereon, the cylindrical surface of the shaft itself serving as the other inner race, independent outer races of bearing metal of different diameters the smaller cooperating with the grooved inner race and the larger with the surface of the shaft, a generally cylindrical stationary housing affixed to the vacuum envelope, stepped radial shoulders spaced from one another within the housing to accommodate outer races, and balls within the races permitting relative rotation between the shaft and outer races.

GEORGE J. AGULE.

References Cited in the file of this patent

UNITED STATES PATENTS

| Number | Name | Date |
| --- | --- | --- |
| 2,141,924 | Middel | Dec. 27, 1938 |
| 2,274,865 | Machlett | Mar. 3, 1942 |

FOREIGN PATENTS

| Number | Country | Date |
| --- | --- | --- |
| 603,896 | Germany | Sept. 20, 1934 |